United States Patent [19]

Hanusa

[11] Patent Number: 5,013,766

[45] Date of Patent: May 7, 1991

[54] CLOSED CELL, RIGID POLYURETHANE FOAM

[75] Inventor: Lotar H. Hanusa, Pittsburgh, Pa.

[73] Assignee: Mobay Corporation, Pittsburgh, Pa.

[21] Appl. No.: 407,841

[22] Filed: Sep. 15, 1989

[51] Int. Cl.[5] .............................................. C08G 18/14
[52] U.S. Cl. .................................... 521/137; 521/159;
521/167; 521/172; 521/174; 521/176
[58] Field of Search ............... 521/137, 159, 167, 172, 521/174, 176

[56] References Cited

U.S. PATENT DOCUMENTS

| | | | |
|---|---|---|---|
| 4,092,276 | 5/1978 | Narayan | 260/2.5 |
| 4,094,828 | 6/1978 | Klein | 260/2.5 |
| 4,362,823 | 12/1982 | Wernsing | 521/116 |
| 4,923,904 | 5/1990 | Hasegawa et al. | 521/176 |

*Primary Examiner*—Maurice J. Welsh
*Attorney, Agent, or Firm*—Joseph C. Gil

[57] ABSTRACT

The present invention is directed to the discovery that relatively long chain polyols, which are typically used to produce flexible foams, can be used to produced closed cell rigid polyurethane foams.

5 Claims, No Drawings

CLOSED CELL, RIGID POLYURETHANE FOAM

BACKGROUND OF THE INVENTION

It is known to prepare rigid polyurethane foams by the reaction of isocyanates and polyols in the presence of blowing agents, catalysts and foam stabilizers. The addition of high water levels to standard rigid foam systems often results in an equivalent ratio imbalance and reduced processing latitude. The resultant foam tends to have a friable surface leading to poor adhesion which is particularly disadvantageous in the producing of appliances. In addition, when compared to standard foam systems, slower systems (i.e., gel times of more than 100 seconds), show significant primary shrinkage. Primary shrinkage is the shrinkage which occurs within the first 24 hours after the foam is made without subjecting the foam to any special test conditions.

A considerable effort has been expended to develop systems with both low chlorofluorocarbon levels and relatively long reactivity. When conventional systems which are acceptable under fast molding conditions are slowed down, the overall performance deteriorates. Specifically, the resultant foams become friable and pull away from the walls of the appliance within hours.

Polyols conventionally used to produce flexible foams are used extensively in elastomers and in ultra low density molded applications, such as packaging foams. A typical packaging foam formulation contains a 35 OH number triol, water, surfactant and catalyst. In all these cases, extreme care is taken to obtain a nearly total open cell content in order to prevent foam collapse and shrinkage. In the case of elastomers, they are generally prepared in such a way so as to prevent foam formation.

Typically, in the preparation of rigid, closed cell polyurethane foams, the polyols used are of a relatively high hydroxyl number (see, e.g., U.S. Pat. No. 4,092,276). U.S. Pat. No. 4,094,828 describes the preparation of a rigid polyurethane foam from a polyether polyol having a hydroxyl number of from 200 to 800 and a copolymer of allyl alcohol and styrene. The hydroxyl numbers of the only two allyl alcohol/styrene copolymers exemplified in the '828 patent are 280 and 249.

U.S. Pat. No. 4,362,823 describes the preparation of a rigid closed cell polyurethane foam wherein from about 0.1 to about 3 parts by weight per 100 parts by weight of rigid polyol, of a propoxylated propylene glycol is used as a substitute for a standard surfactant.

DESCRIPTION OF THE INVENTION

The present invention is directed to the discovery that the addition of a long chain polyol of the type conventionally used to prepare flexible polyurethane foams to a rigid foam system can overcome the various problems noted above. Previous experience had shown that the addition of as little as 1 to 2% by weight of flexible polyols to the polyol component of standard rigid foams resulted in an incompatible mixture as evidenced by turbidity and/or separation of the chlorofluorocarbon. It has unexpectedly been found that systems containing lower amounts of chlorofuorocarbons are compatible with even relatively high levels of flexible type polyols. Furthermore, the addition of flexible type polyols resulted in foams without any detectable friability and with exceptionally good adhesion.

More particularly, the present invention is directed to a process for preparing a rigid, closed cell polyurethane foam and to foam so produced. The process comprises reacting:
  (a) an organic di and/or polyisocyanate and
  (b) a polyol mixture comprising:
    (i) one or more polyols having an hydroxyl functionality of from 3 to 8 and an hydroxyl number of from about 300 to about 800, and
    (ii) from about 10 to about 90 parts by weight, preferably from about 15 to 40 parts by weight, per 100 parts by weight of polyol (i), of one or more polyols having an hydroxyl functionality of from 2 to 3 and an hydroxyl number of from about 25 to about 115, in the presence of
  (c) a catalyst,
  (d) a blowing agent, and
  (e) a foam stabilizer, at an isocyanate index of form about 70 to about 115, and preferably from about 95 to about 105.

Isocyanates which may be used as starting materials in the present invention include: aliphatic, cycloaliphatic, araliphatic, aromatic and heterocyclic polyisocyanates of the type described for example by W. Siefken in Justus Liebigs Annalen der Chemie, 562, pages 75 to 136, for example those corresponding to the formula $$Q(NCO)_n$$

in which:
  n=2-4, preferably 2, and
  Q represents an aliphatic hydrocarbon radical containing from 4 to 18 carbon atoms (preferably from 6 to 10 carbon atoms), a cycloaliphatic hydrocarbon radical containing from 4 to 15 (preferably from 5 to 10) carbon atoms, an aromatic hydrocarbon radical containing from 6 to 15 carbon atoms (preferably from 8 to 13 carbon atoms).

Specific examples of such isocyanates include: 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenyl methane -2,4'- and/or -4,4'-diisocyanate; and naphthylene-1,5-diisoscyanate.

It is also possible to use triphenyl methane-4,4',4''-triisocyanate; polyphenyl polymethylene polyisocyanates of the type obtained by condensing aniline with formaldehyde, followed by phosgenation, and described for example in British Patent Nos. 874,430 and 848,671; m- and p-isocyanatophenyl sulfonyl isocyanates according to U.S. Pat. No. 3,454,606; perchlorinated aryl polyisocyanates of the type described in German Auslegeschrift No. 1,157,601 (U.S. Pat. No. 3,277,138); polyisocyanates containing carbodiimide groups of the type described in German Patent No. 1,092,007 (U.S. Pat. No. 3,152,162) and in German Offenlegungsschriften Nos. 2,504,400; 2,537,685 and 2,552,250; norbornane diisocyanates according to U.S. Pat. No. 3,492,330); polyisocyanates containing allophanate groups of the type described in British Patent No. 994,890, in Belgian Patent No. 761,626 and in Dutch Patent Application No. 7,102,524; polyisocyanates containing isocyanurate groups of the type described in U.S. Pat. No. 3,001,973; German Patent Nos. 1,022,789, 1,222,067 and 1,027,394 and 2,004,048; polyisocyanates containing urethane groups of the type described in Belgian Patent No. 752,261 or U.S. Pat. Nos. 3,394,164 and 3,644,457, and of the type typically used in the production of rigid foams; polyisocyanates containing acylated urea groups according to German Patent No. 1,230,778; polyisocyanates containing biuret groups of the type described, for example in U.S. Pat. Nos. 3,124,605, 3,201,373 and in British Patent No. 889,050; polyisocyanates produced by telomerization reactions of the type described for example in U.S. Pat. No. 3,654,106; polyisocyanates containing ester groups of the type described for example in British Patent Nos. 965,474 and 1,072,956, in U.S. Pat. No. 3,567,763 and in German Patent No. 1,231,688; reaction products of the above-mentioned diisocyanates with acetals according to German Patent No. 1,072,385; and polyisocyanates containing polymeric fatty acid esters according to U.S. Pat. No. 3,455,883.

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates.

In general, it is particularly preferred to use the commercially readily available polyisocyanates, such as 2,4- and 2,6-tolylene diisocyanate, and any mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate.

As noted above, the present invention is directed to use of a polyol blend comprising:
(i) one or more polyols having an hydroxyl functionality of from 3 to 8 and an OH number of from 300 to 800, and
(ii) from about 10 to about 90 parts by weight per 100 parts of polyol (i) of one or more polyols having an hydroxyl functionality of from 2 to 3 and an OH number of from about 25 to about 120.

The polyols useful herein can be substantially any polyol so long as it has the required OH number and OH functionality. Examples of such polyols include polyesters, polythioethers, polyacetals, polycarbonates and polyester amides.

Polyesters containing hydroxyl groups suitable for use in accordance with the present invention, are for example, reaction products of polyhydric (preferably dihydric and, optionally, trihydric) alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated. Examples of carboxylic acids such as these and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid anhydride, dimerized and trimerized unsaturated fatty acids (optionally in admixture with monomeric unsaturated fatty acids, such as oleic acid), terephthalic acid dimethyl ester and terephthalic acid-bis-glycol ester. 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol and sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example ε-caprolactone, or of dihydroxy carboxylic acids, for example ω-hydroxy caproic acid, may also be used.

Polyethers suitable for use in accordance with the present invention are also known. Such polyethers may be obtained for example by polymerizing epoxides (such as ethylene oxide, propylene oxide, butylene oxide, tetrahydrofuran, styrene oxide or epichlorohydrin) themselves, for example in the presence of Lewis catalysts (such as $BF_3$) or by the addition of these epoxides (preferably ethylene oxide and propylene oxide, optionally in admixture or successively) with starter components containing reactive hydrogen atoms such as water, alcohols, ammonia or amines. Specific examples of starter components are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described for example in German Auslegeschriften Nos. 1,176,358 and 1,064,938 and formitol-or formose-started polyethers (German Offenlegungsschriften Nos. 2,639,083 and 2,737,951) may also be used in accordance with the invention. In many cases, it is preferred to use polyethers which predominantly contain primary OH-groups (up to 90 wt. %, based on all the OH-groups present in the polyether). Polybutadienes containing OH-groups are also suitable for use in accordance with the present invention.

Polythioethers useful as starting materials in the present invention include the condensation products of thiodiglycol on its own and/or with other glycols, dicarboxylic acids, formaldehyde, aminocarboxylic acids or amino alcohols. Depending upon the co-components, the products may be polythio mixed ethers, polythioether esters or polythioether ester amides.

Suitable polyacetal starting materials for the process of the present invention are, for example, the compounds obtainable from glycols such as diethylene glycol, triethylene glycol, 4,4'-dioxethoxy diphenyl dimethyl methane, hexane diol and formaldehyde. Other polyacetals useful in the process of the present invention may also be obtained by polymerizing cyclic acetals such as trioxane (German Offenlegungsschrift No. 1,694,128).

Polycarbonates containing hydroxyl groups useful in the present invention are known and may be obtained for example by reacting diols (such as 1,3-propane diol, 1,4-butane diol and/or 1,6-hexane diol, diethylene glycol) with diaryl carbonates (for example diphenyl carbonate), or phosgene (German Auslegeschriften Nos. 1,694,080, 1,915,908 and 2,221,751; German Offenlegungsschrift No. 2,605,024).

The polyester amides and polyamides which may be used as starting materials in the process of the present invention include the predominantly linear condensates obtained for example from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and optionally modified natural polyols, such as castor oil or carbohydrates (for example starch), may also be used in the present invention. Addition products of alkylene oxides with phenol-formaldehyde resins or even with urea-formaldehyde resins may also be used.

Before they are used in the polyisocyanate-polyaddition process, the above-mentioned polyhydroxyl compounds may be modified in various ways. According to German Offenlegungsschriften Nos. 2,210,839 (U.S. Pat. No. 3,849,515) and 2,544,195, a mixture of different polyhydroxy compounds (for example a polyether polyol and a polyester polyol) may be condensed by etherification in the presence of a strong acid to form a relatively high molecular weight polyol which is made up of different segments attached through ether bridges. It is also possible, in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acids esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphono-formamidine or acyl urea groups (German Offenlegungsschriften Nos. 2,714,289; 2,714,292 and 2,714,293). In some cases, it is of particular advantage to completely or partly convert the relatively high molecular weight polyhydroxyl compounds into the anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Other processes for producing relatively high molecular weight compounds containing terminal amino groups or hydrazide groups are described in German Offenlegungsschriften Nos. 1,694,152 (U.S. Pat. No. 3,625,871); 2,948,419, 3,039,600; 3,131,252 and 3,223,298.

It is also possible to use polyhydroxyl compounds containing high molecular weight polyadducts and polycondensates or polymers in finely disperse or dissolved form. Polyhydroxyl compounds such as those may be obtained for example by polyaddition reactions (for example reactions between polyisocyanates and amino-functional compounds) and polycondensation reactions (for example between formaldehyde and phenols and/or amines) in situ in the above-mentioned compounds containing hydroxyl groups. Processes such as these are described for example in German Auslegeschriften Nos. 168,075, 1,260,142 and in German Offenlegungsschriften Nos. 2,324,134; 2,423,984; 2,512,385; 2,513,815; 2,550,896, 2,550,797; 2,550,833; 2,550,862; 2,633,293 and 2,639,254. However, it is also possible, in accordance with U.S. Pat. No. 3,869,413 or German Offenlegungsschrift No. 2,550,860 to mix an aqueous polymer dispersion with a polyhydroxyl compound and subsequently to remove the water from the mixture.

Polyhydroxyl compounds modified by vinyl polymers obtained for example by polymerizing styrene and acrylonitrile in the presence of polyethers (U.S. Pat. Nos. 3,383,351; 3,304,273; 3,523,093; and 3,110,695; German Auslegeschrift No. 1,152,536) or polycarbonate polyols (German Patent No. 1,769,795; U.S. Pat. No. 3,637,909) are also suitable for use in the process of the present invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and optionally, other olefinically unsaturated monomers (German Offenlegungsschriften Nos. 2,714,291; 2,739,620 and 2,654,746) may be used with particular advantage in combination with mineral fillers.

Where modified polyhydroxyl compounds of the type mentioned above are used as starting components in the polyisocyanate-polyaddition process, polyurethane plastics having considerably improved mechanical properties are formed in many cases.

Other representatives of the above-mentioned compounds useful in the present invention are described for example in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5-6 and 198-199, and in Kunststoff-Handbuch, Vol. VII, Vieweg-Hochtlen, Carl-Hanser-Verlag, Munich, 1966, for example on pages 45 to 71. It is of course possible to use mixtures of the above-mentioned compounds containing the requisite OH functionality and OH number, such as mixtures of polyethers and polyesters.

In some cases, it is of particular advantage to combine low-melting and high-melting polyhydroxyl compound with one another (German Offenlegungsschrift No. 2,706,297).

Generally, the high and low OH number polyols are merely mixed together. However, it is also possible to prereact all or a portion of the low OH number polyol with the isocyanate to form an isocyanate terminated prepolymer which is then reacted with the high OH number polyol and any low OH number polyol not used in forming the prepolymer.

The blowing agents which may be used in the process of the present invention include water and/or readily volatile inorganic or organic substances. Organic blowing agents include acetone, ethylacetate; halogen-substituted alkanes, such as methylene chloride, chloroform, ethylidene chloride, vinylidene chloride, monofluorotrichloromethane, chlorodifluoromethane, dichlorodifluoromethane; also butane, hexane, heptane or diethyl ether. Inorganic blowing agents are, for example, air, $CO_2$ or $N_2O$. A blowing effect may also be obtained by adding compounds which decompose at temperatures above room temperature giving off gases, (such as azodicarbonamide or azoisobutyronitrile). Other examples of blowing agents and information on the use of blowing agents may be found in Kunststoff-Handbuch, Vol. VII, by Vieweg and Hochtlen, Carl-Hanser-Verlag, Munich, 1966, on pages 108 and 109, 453 to 455 and 507 to 510.

Known catalysts such as tertiary amines are also used in the process of the present invention. Specific examples of appropriate catalysts are triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528), 1,4-diazabicyclo-(2,2,2)-octane, N-methyl-N'-dimethylaminoethyl piperazine, bis-(dimethylaminoalkyl)-piperazines (German Offenlegungsschrift No. 2,636,787), N,N-dimethylbenzylamine, N,N-dimethyl cyclohexylamine, N,N-diethyl benzylamine, bis-(N,N,-diethylaminoethyl)-adipate, N,N,N',N'-tetramethyl-1,3-butane diamine, N,N-dimethyl-β-phenyl ethylamine, 1,2-dimethyl imidazole, monocyclic and bicyclic amidines (German Offenlegungsschrift No. 1,720,633), bis-(dialkylamino)-alkyl ethers (U.S. Pat. No. 3,330,782, German Auslegeschrift No. 1,030,558, German Offenlegungsschriften Nos. 1,804,361 and 2,618,280) and tertiary amines containing amide group (preferably formamide groups) according to German Offenlegungsschrift No. 2,523,633 and 2,732,292. Suitable catalysts also include known Mannich bases of secondary amines, such as dimethylamine, aldehydes, preferably formaldehyde; ketones, such as acetone, methylethyl ketone and cyclohexanone; and phenols, such as phenol, nonyl phenol and bisphenol.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine, their reaction products with alkylene oxides (such as propylene oxide and/or ethylene oxide) and also secondary-tertiary amines according to German Offenlegungsschrift No. 2,732,292.

Other suitable catalysts are sila-amines containing carbon-silicon bonds, of the type described in German Patent No. 1,229,290 (corresponding to U.S. Pat. No. 3,620,984), for example 2,2,4-trimethyl-2-silamorpholine and 1,3-diethyl-aminomethyl tetramethyl disiloxane.

Nitrogen-containing bases (such as tetraalkyl ammonium hydroxides), alkali hydroxides (such as sodium hydroxide), alkali phenolates (such as sodium phenolate), or alkali alcoholates (such as sodium methylate) may also be used as catalysts. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effects are described in German Offenlegungsschriften Nos. 2,062,286; 2,062,288; 2,117,576 (U.S. Pat. No. 3,758,444); 2,129,198; 2,330,175 and 2,330,211.

It is also possible to use organometallic compounds, particularly organo tin compounds, as catalysts. In addition to sulfur-containing compounds, such as di-n-octyl tin mercaptide (German Auslegeschrift No. 1,769,367; U.S. Pat. No. 3,654,927), preferred organotin compounds are tin(II)salts of carboxylic acids (such as tin-(II)acetate, tin(II)octoate, tin(II)ethyl hexoate and tin-(II)laurate, and tin(IV)compounds (for example, dibutyl tin oxide, dibutyl tin dichloride, dibutyl tin diacetate, dibutyl tin dilaurate, dibutyl tin maleate and dioctyl tin diacetate).

All the above-mentioned catalysts may of course be used in the form of mixtures. In this respect, combinations of organometallic compounds and amidines, aminopyridines or hydrazino pyridines (German Offenlegungsschriften Nos. 2,434,185; 2,601,082 and 2,603,834) are of particular interest.

Other representative catalysts suitable for use in accordance with the invention and information on the way in which they work can be found in Kunststoff-Handbuch by Vieweg and Hochtlen, Vol. VII, Carl-Hanser-Verlag, Munich, 1966 on pages 96 to 102.

Suitable foam stabilizers are, polyether siloxanes, particularly water soluble types. The structure of these compounds is generally such that a copolymer of ethylene oxide and propylene oxide is attached to a polydimethyl siloxane residue. Foam stabilizers such as these are described for example in U.S. Pat. No. 2,834,748; 2,917,480 and 3,629,308. In many cases, polysiloxane-polyoxyalkylene copolymers branched through allophanate groups according to German Offenlegungsschrift No. 2,558,523 are of particular interest.

Reaction retarders, for example, acid-reacting substances, such as hydrochloric acid or organic acid halides, known cell regulators such as paraffins, fatty alcohols or dimethyl polysiloxanes as well as pigments, dyes, flameproofing agents (for example tris-chloroethyl phosphate, tricresyl phosphate or ammonium phosphate and polyphosphate), stabilizers against the effects of aging and weather, plasticizers and fungistatic and bacteriostatic substances and fillers (such as barium sulfate, kieselguhr, carbon black or whiting) may also be included in the reaction mixture of the present invention.

Further examples of additives, foam stabilizers, cell regulators, reaction retarders, stabilizers, flameproofing agents, plasticizers, dyes, fillers, fungistatic and bacteriostatic substances which may optionally be used in accordance with the invention and information on the way in which these additives are used and on their respective modes of action can be found in Kunststoff-Handbuch by Vieweg and Hochtlen, Vol. VII, Carl-Hanser-Verlag, Munich, 1966, on pages 103 to 113.

The process according to the invention may be carried out by the one-shot process, by the prepolymer process or by the semi-prepolymer process. Machines of the type described in U.S. Pat. No. 2,764,565 may be used. Particulars of processing machines which may be used in accordance with the invention can be found in Kunststoff-Handbuch by Vieweg and Hochtlen, Vol. VII, Carl-Hanser-Verlag, Munich, 1966, on pages 121 to 205.

In the production of foams, it is also possible to carry out foaming in closed molds after the reaction mixture has been introduced into a mold. Suitable mold materials are metals (for example, aluminum) or plastics (for example, epoxide resin). The foamable reaction mixture foams in the mold and forms the molding. In-mold foaming may be carried out in such a way that the molding has a cellular structure at its surface, although it may also be carried out in such a way that the molding has a compact skin and a cellular core. It is possible to introduce foamable reaction mixture into the mold in such a quantity that the foam formed just fills the mold. However, it is also possible to introduce into the mold more foamable reaction mixture than is required for filling the interior of the mold with foam. This particular technique is known as overcharging and is disclosed in U.S. Pat. Nos. 3,178,490 and 3,182,104.

In many cases, known "external release agents" such as silicone oils, are used for in-mold foaming. However, it is also possible to use so-called "internal release agents", optionally in admixture with external release agents, of the type known for example from German Offenlegungsschriften Nos. 2,121,670 and 2,307,589.

However, it is of course also possible to produce foams by block foaming or by the known laminator process.

The products obtainable in accordance with the invention may be used, for example, as heat or cold insulators.

The invention is further illustrated but is not intended to be limited by the following examples in which all parts and percentages are by weight unless otherwise specified.

EXAMPLES

In the examples which follow, the following materials were used:

(A) Polyols having OH functionalities of from 3 to 8 and hydroxyl numbers of from about 300 to about 800:
  (1) RP1: a polyol produced by reacting o-toluene diamine with ethylene oxide and then propylene oxide, having an OH number of about 395 and an OH functionality of 4.
  (2) RP2: a polyol produced a sucrose/propylene glycol/water mixture with propylene oxide, having an OH number of about 340 and an OH functionality of about 6.4.
  (3) RP3: a polyol produced by reacting monoethanolamine with propylene oxide, having an OH number of about 350 and an OH functionality of 3.
  (4) RP4: a polyol produced by reacting monoethanolamine with propylene oxide, having an OH number of about 700 and an OH functionality of 3.
  (5) RP5: (4063) a polyol produced by reacting m-toluene diamine with ethylene oxide and then with propylene oxide, having an OH number of about 460 and an OH functionality of 4.

(B) Polyols having an OH number of from about 25 to about 115, and an OH functionality of from 2 to 3:
  (1) FP1: a polyol produced from a mixture of glycerin and propylene glycol and a mixture of ethylene oxide and propylene oxide, having an OH number of about 56, and an OH functionality of about 2.9, and containing no primary OH groups.
  (2) FP2: a polyol produced from glycerin and a mixture of ethylene oxide and propylene oxide containing about 82% primary OH groups, having an OH number of about 28, and an OH functionality of 3.
  (3) FP3: a polyol produced from propylene glycol and a mixture of ethylene oxide and propylene oxide containing about 91% primary OH groups, having an OH number of about 28 and an OH functionality of 2.
  (4) FP4: a polyol produced from propylene glycol and propylene oxide having an OH number of about 56 and an OH functionality of 2.
  (5) FP5: a polyol produced from glycerin and a mixture of ethyl oxide and propylene oxide containing about 83% primary OH groups, having an OH number of about 35, and an OH functionality of 3.
  (6) FP6: a polyol produced from the same materials as FP5, but containing about 88% primary OH groups, having an OH number of about 28 and an OH functionality of 3.
  (7) FP7: a polyol produced from glycerin and a mixture of ethylene oxide and propylene oxide containing about 78% primary OH groups, having an OH number of about 35, and on OH functionality of 3.
  (8) FP8: a polyol produced from glycerin and a mixture of ethylene and propylene oxides containing about 50% primary OH groups, having an OH number of about 46, and an OH functionality of 3.
  (9) FP9: a polyol similar to FP1, with the only difference being the OH number. FP9 has an OH number of about 49.
  (10) FP10: a glycerin/propylene oxide adduct having an OH number of about 56 and an OH functionality of 3.
  (11) FP11: a propylene glycol/propylene oxide adduct having an OH number of about 112 and an OH functionality of 2.

(C) ISO: Mondur MR isocyanate, a commercially available polymethylene poly(phenylisocyanate), from Mobay Corporation, having an NCO group content of 31.5% by weight.

(D) Other materials:
  (1) L5440: a commercially available silicone surfactant from Union Carbide.
  (2) Polycat 8: dimethylcyclohexylamine.
  (3) R11SBA: a stabilized Freon 11, available from DuPont.
  (4) TMR-2: an amine catalyst commercially available from Air Products.
  (5) DMEA: dimethylethanolamine
  (6) Water

EXAMPLES 1 THROUGH 26

In Examples 1–26, resin blends were prepared by weighing all the components into a suitable container and mixing thoroughly. The isocyanate and resin were then separately brought to 20° C. The isocyanate and resin components were then weighed into a mix container, mixed for ten seconds and poured into pre-weighed empty paper gallon containers. The cream time (determined as the start of foam movement), the gel time (noted when the foam solidified or formed a string) and the tack free time (when the foam could be touched without feeling tacky) were measured. Any observations regarding foam quality and friability were noted. After 24 hours, any visible shrinkage was noted and the cup density was measured. The formulations used and the results obtained were as indicated in Table 1. The foams of Examples 1 through 4 showed no surface friability and from very slight to zero shrinkage. The foams from Examples 5 through 8 and 11 through 26 exhibited very slight to no shrinkage. The foams of examples 9 and 10 (which are comparative examples) exhibited severe shrinkage.

poured into a 13 by 25 by 2 polyethylene lined box. The box was opened after a period of time, the panels removed, and checked for fill appearance, voids, and the like. The panels were tested for k-factor and closed cell content. The formulations used and the results obtained

TABLE 1

| EXAMPLE | 1 | 2 | 3 | 4 | 5 | 6 | 7 | 8 | 9 | 10 | 11 | 12 | 13 |
|---|---|---|---|---|---|---|---|---|---|---|---|---|---|
| Resin Side | | | | | | | | | | | | | |
| RP1 | 54.1 | — | 58.7 | — | 45.0 | 45.0 | 45.0 | 45.0 | 35.0 | 40.0 | 58.7 | 58.7 | 58.7 |
| RP2 | — | 44.7 | — | 47.1 | — | — | — | — | — | — | — | — | — |
| RP3 | — | 19.2 | — | 20.2 | — | — | — | — | — | — | — | — | — |
| RP4 | — | — | — | — | 5.0 | 5.0 | 5.0 | 5.0 | 5.0 | 5.0 | — | — | — |
| FP1 | — | — | 22.4 | 13.8 | 36.1 | 36.2 | 36.1 | 36.1 | 46.1 | 41.1 | — | — | — |
| FP2 | — | — | — | — | — | — | — | — | — | — | — | — | — |
| FP3 | — | — | — | — | — | — | — | — | — | — | 22.4 | — | — |
| FP4 | — | — | — | — | — | — | — | — | — | — | — | 22.4 | — |
| FP5 | — | — | — | — | — | — | — | — | — | — | — | — | 22.4 |
| FP6 | — | — | — | — | — | — | — | — | — | — | — | — | — |
| FP7 | — | — | — | — | — | — | — | — | — | — | — | — | — |
| FP8 | — | — | — | — | — | — | — | — | — | — | — | — | — |
| FP9 | — | — | — | — | — | — | — | — | — | — | — | — | — |
| FP10 | — | — | — | — | — | — | — | — | — | — | — | — | — |
| FP11 | 27.0 | 17.2 | — | — | — | — | — | — | — | — | — | — | — |
| L5440 | 1.5 | 1.5 | 1.5 | 1.5 | 1.6 | 1.6 | 1.6 | 1.6 | 1.6 | 1.6 | 1.5 | 1.5 | 1.5 |
| POLYCAT 8 | 0.6 | 0.6 | 0.6 | 0.6 | 0.35 | 0.35 | 0.35 | 0.35 | 0.30 | 0.30 | 0.40 | 0.40 | 0.40 |
| WATER | 2.8 | 2.8 | 2.8 | 2.8 | 3.75 | 4.0 | 4.5 | 5.4 | 5.1 | 5.25 | 2.8 | 2.8 | 2.8 |
| R-11SBA | 14.0 | 14.0 | 14.0 | 14.0 | 9.5 | 8.0 | 5.0 | — | — | — | 16.0 | 16.0 | 16.0 |
| Isocyanate Side | | | | | | | | | | | | | |
| ISO | 100 | 100 | 100 | 100 | 114 | 118 | 126 | 139 | 127 | 133 | 103 | 103 | 103 |
| React. Times Sec. | | | | | | | | | | | | | |
| MIX | 10 | 10 | 10 | 10 | 10 | 10 | 10 | 10 | 10 | 10 | 10 | 10 | 10 |
| CREAM | 28 | 36 | 24 | 32 | 29 | 29 | 28 | 31 | 31 | 32 | 29 | 30 | 31 |
| GEL | 101 | 151 | 97 | 135 | 112 | 109 | 104 | 93 | 107 | 104 | 120 | 126 | 120 |
| TACK-FREE | 215 | 371 | 212 | 285 | 280 | 254 | 268 | 242 | 360 | 245 | 234 | 262 | 232 |
| RISE | 250 | 300 | 230 | 265 | 290 | 290 | 280 | 265 | 310 | 280 | 330 | 330 | 340 |
| DENSITY, PCF | 1.52 | 1.58 | 1.64 | 1.58 | 1.64 | 1.66 | 1.65 | 1.66 | 1.73 | 1.71 | 1.58 | 1.58 | 1.58 |

| EXAMPLE | 14 | 15 | 16 | 17 | 18 | 19 | 20 | 21 | 22 | 23 | 24 | 25 | 26 |
|---|---|---|---|---|---|---|---|---|---|---|---|---|---|
| Resin Side | | | | | | | | | | | | | |
| RP1 | 58.7 | 58.7 | 58.7 | 58.7 | 58.7 | 58.7 | 58.7 | 58.7 | 58.7 | 58.7 | 58.7 | 58.7 | 58.7 |
| RP2 | — | — | — | — | — | — | — | — | — | — | — | — | — |
| RP3 | — | — | — | — | — | — | — | — | — | — | — | — | — |
| RP4 | — | — | — | — | — | — | — | — | — | — | — | — | — |
| FP1 | — | — | — | — | — | — | 22.4 | 20.2 | 18.0 | 15.8 | 13.6 | 11.5 | 9.5 |
| FP2 | — | — | — | — | — | 22.4 | — | — | — | — | — | — | — |
| FP3 | — | — | — | — | — | — | — | — | — | — | — | — | — |
| FP4 | — | — | — | — | — | — | — | — | — | — | — | — | — |
| FP5 | — | — | — | — | — | — | — | — | — | — | — | — | — |
| FP6 | 22.4 | — | — | — | — | — | — | — | — | — | — | — | — |
| FP7 | — | 22.4 | — | — | — | — | — | — | — | — | — | — | — |
| FP8 | — | — | 22.4 | — | — | — | — | — | — | — | — | — | — |
| FP9 | — | — | — | 22.4 | — | — | — | — | — | — | — | — | — |
| FP10 | — | — | — | — | 22.4 | — | — | — | — | — | — | — | — |
| FP11 | — | — | — | — | — | — | — | — | — | — | — | — | — |
| L5440 | 1.5 | 1.5 | 1.5 | 1.5 | 1.5 | 1.5 | 1.5 | 1.5 | 1.5 | 1.5 | 1.5 | 1.5 | 1.5 |
| POLYCAT 8 | 0.40 | 0.40 | 0.40 | 0.40 | 0.40 | 0.40 | 0.40 | 0.40 | 0.40 | 0.40 | 0.40 | 0.40 | 0.40 |
| WATER | 2.8 | 2.8 | 2.8 | 2.8 | 2.8 | 2.8 | 2.8 | 2.75 | 2.70 | 2.68 | 2.65 | 2.62 | 2.59 |
| R-11SBA | 16.0 | 16.0 | 16.0 | 16.0 | 16.0 | 16.0 | 16.0 | 15.8 | 15.7 | 15.4 | 15.2 | 15.0 | 14.8 |
| Isocyanate Side | | | | | | | | | | | | | |
| ISO | 103 | 103 | 103 | 103 | 103 | 103 | 102 | 101 | 100 | 100 | 99 | 98 | 97 |
| React. Times Sec. | | | | | | | | | | | | | |
| MIX | 10 | 10 | 10 | 10 | 10 | 10 | 10 | 10 | 10 | 10 | 10 | 10 | 10 |
| CREAM | 29 | 31 | 29 | 30 | 31 | 31 | 29 | 30 | 31 | 30 | 29 | 28 | 27 |
| GEL | 122 | 117 | 118 | 130 | 129 | 119 | 132 | 134 | 127 | 132 | 123 | 112 | 106 |
| TACK-FREE | 245 | 230 | 250 | 297 | 291 | 295 | 259 | 281 | 260 | 272 | 241 | 281 | 207 |
| RISE | 335 | 310 | 300 | 325 | 310 | 310 | 330 | 335 | 320 | 335 | 310 | 275 | 260 |
| DENSITY, PCF | 1.61 | 1.58 | 1.61 | 1.62 | 1.60 | 1.64 | 1.59 | 1.57 | 1.56 | 1.55 | 1.56 | 1.49 | 1.47 |

EXAMPLES 27 THROUGH 35

Laboratory panels were prepared using the same technique as used in examples 1 through 26, except that instead of a paper container, the reaction mixture was were as indicated in Table 2. Upon aging, the foams of examples 27 through 35 showed an increase of 10 to 20% in k-factor, which is typical for unfaced, closed cell rigid foams.

TABLE 2

| EXAMPLE | 27 | 28 | 29 | 30 | 31 | 32 | 33 | 34 | 35 |
|---|---|---|---|---|---|---|---|---|---|
| RP1 | 58.7 | 58.7 | 58.7 | 58.7 | 58.7 | 58.7 | 58.7 | 58.7 | 58.7 |
| FP1 | 22.4 | — | — | — | — | — | — | — | — |

TABLE 2-continued

| EXAMPLE | 27 | 28 | 29 | 30 | 31 | 32 | 33 | 34 | 35 |
|---|---|---|---|---|---|---|---|---|---|
| FP2 | — | 22.4 | — | — | — | — | — | — | — |
| FP3 | — | — | 22.4 | — | — | — | — | — | — |
| FP4 | — | — | — | 22.4 | — | — | — | — | — |
| FP5 | — | — | — | — | 22.4 | — | — | — | — |
| FP6 | — | — | — | — | — | 22.4 | — | — | — |
| FP7 | — | — | — | — | — | — | 22.4 | — | — |
| FP8 | — | — | — | — | — | — | — | 22.4 | — |
| FP9 | — | — | — | — | — | — | — | — | 22.4 |
| L-5440 | 1.5 | 1.5 | 1.5 | 1.5 | 1.5 | 1.5 | 1.5 | 1.5 | 1.5 |
| POLYCAT 8 | 0.4 | 0.4 | 0.4 | 0.4 | 0.4 | 0.4 | 0.4 | 0.4 | 0.4 |
| WATER | 2.8 | 2.8 | 2.8 | 2.8 | 2.8 | 2.8 | 2.8 | 2.8 | 2.8 |
| R-11-SBA | 16 | 16 | 16 | 16 | 16 | 16 | 16 | 16 | 16 |
| ISO | 103 | 103 | 103 | 103 | 103 | 103 | 103 | 103 | 103 |
| PANEL WEIGHT (grams) | 339 | 351 | 344 | 337 | 348 | 346 | 336 | 344 | 338 |
| FOAM DENSITY (pcf) | 1.99 | 2.06 | 2.02 | 1.97 | 2.04 | 2.03 | 1.97 | 2.02 | 1.98 |
| THICKNESS (inches) | 1.95 | 1.98 | 2.02 | 1.98 | 2.01 | 1.98 | 1.95 | 1.98 | 1.98 |
| K FACTOR | 0.147 | 0.146 | 0.14 | 0.146 | 0.14 | 0.142 | 0.143 | 0.145 | 0.146 |
| % CLOSED CELL | 82 | 80 | 85 | 74 | 82 | 82 | 82 | 79 | 83 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a rigid, closed cell polyurethane foam comprising reacting:
   (a) an organic di and/or polyisocyanate and
   (b) a polyol mixture comprising:
      (i) a polyol having an hydroxyl functionality of from 3 to 8 and an hydroxyl number of from about 300 to about 800, and
      (ii) from about 10 to about 90 parts by weight per 100 parts by weight of polyol (i), of a polyol having an hydroxyl functionality of from 2 to 3 and an hydroxyl number of from about 25 to about 115, in the presence of
   (c) a catalyst,
   (d) a blowing agent, and
   (e) a foam stabilizer, at an isocyanate index of form about 70 to about 115.

2. The process of claim 1 wherein component (b) (ii) is present in an amount of from about 15 to about 40 parts by weight per 100 parts by weight of polyol (i).

3. The process of claim 1, wherein said index is from about 95 to about 105.

4. The process of claim 1, wherein all or a portion of polyol (ii) is first reacted with said isocyanate to form an isocyanate terminated prepolymer which is then reacted with polyol (i) and any remaining portion of polyol (ii).

5. A polyurethane foam produced by the process of claim 1.

* * * * *